Dec. 10, 1957  P. J. H. JANSSEN ET AL  2,816,247
CIRCUIT ARRANGEMENT FOR PRODUCING A SAWTOOTH-SHAPED
CURRENT IN A VERTICAL DEFLECTOR COIL
Filed March 17, 1955
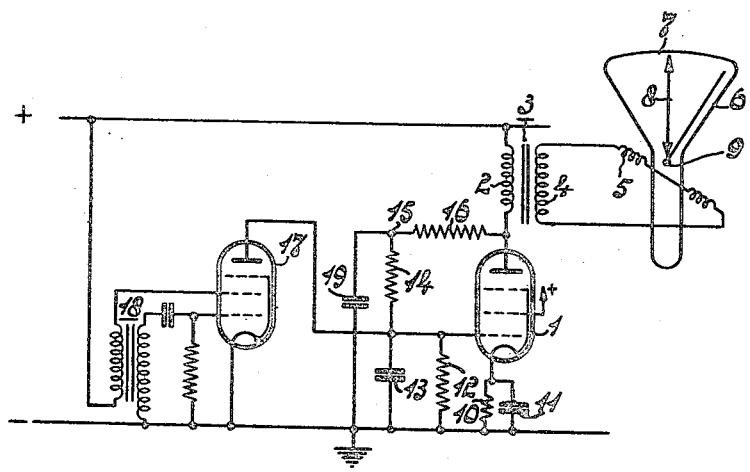
INVENTORS
PETER JOHANNES HUBERTUS JANSSEN
WOUTER SMEULERS
BY
AGENT

United States Patent Office 2,816,247
Patented Dec. 10, 1957

2,816,247

CIRCUIT ARRANGEMENT FOR PRODUCING A SAWTOOTH-SHAPED CURRENT IN A VERTICAL DEFLECTOR COIL

Peter Johannes Hubertus Janssen and Wouter Smeulers, Eindhoven, Netherlands, assignors, by mesne assignments, to North American Philips Company, Inc., New York, N. Y., a corporation of Delaware Application March 17, 1955, Serial No. 495,015

Claims priority, application Netherlands March 27, 1954

2 Claims. (Cl. 315—27)

The invention relates to a circuit arrangement for producing a sawtooth-shaped current in a vertical deflecting coil for deflecting the electron beam in a cathode-ray tube of a television device in which the radius of curvature of the screen exceeds the distance between said screen and the centre of deflection of the vertical deflector coil, which coil is included in the anode circuit of a tube, in which arrangement a capacitor connected in the control grid circuit of the tube is periodically charged via a charging resistance.

When the radius of curvature of the screen of the cathode-ray tube exceeds the distance between said screen and the deflection centre of the vertical deflector coil this results, as is well known, in that, when a linear deflection current is used in the deflector coil, the writing speed of the electron beam on the screen increases at the beginning and the end of the stroke of the sawtooth-shaped current.

It is also well known that this limitation can be obviated in that the current in the deflector coil is not increased linearly with respect to time but instead the increase is S-shaped. For this purpose the form of the control grid voltage of the tube of which the anode circuit includes the coil must be changed. If this control grid voltage is obtained by charging a capacitor through a resistor, it is also known per se to change the form of the voltage set up across the capacitor by varying the voltage which is active in the charging circuit.

In the circuit arrangement in accordance with the invention also use is made of a variation of the voltage set up in the charging circuit.

The circuit arrangement in accordance with the invention is characterized in that the end of this charging resistor more remote from the capacitor is connected to the anode of the tube through an integrating network and the time constant of this network is at least twice the duration of the period of one scanning.

The circuit arrangement in accordance with the invention is based on recognition of the fact that a vertical deflector coil substantially behaves like a resistor. If, for example, said coil is coupled to the anode circuit of a tube through a transformer, the circuit equivalent to this anode impedance in first approximation consists of the primary inductance of the transformer with which the resistance of the coil which is transformed to the primary side of the transformer is connected in parallel. The coil and consequently the resistor pass a substantially sawtooth-shaped current and, since the voltage across the resistor is equal to the voltage across the primary inductance of the transformer, across this inductance a substantially sawtooth-shaped voltage is produced. Consequently, the anode voltage of the tube exhibits a sawtooth-shaped variation. This anode voltage is supplied to the integrating network so that a parabolic output voltage is produced which is utilised as a voltage source in the charging circuit of the capacitor and causes substantially the desired variation of the control grid voltage.

The invention will now be described more fully with reference to the accompanying drawing showing in schematic form an embodiment of the invention.

The anode circuit of a tube 1 includes the primary winding 2 of a transformer 3. To the secondary winding 4 vertical deflector coils 5 for a cathode ray tube 6 are connected.

The radius of curvature of the screen 7 of said tube exceeds the distance 8 between the screen 7 and the centre of deflection 9 of the coil 5.

The cathode circuit arrangement of the tube 1 includes the usual parallel connection of a resistor 10 and a capacitor 11 for producing the negative bias voltage of the control grid of the tube 1, which bias voltage is supplied to the control grid through a resistor 12. The control grid circuit further includes a capacitor 13 which is charged through a resistor 14. The end 15 of the resistor 14 more remote from the capacitor 13 is connected to the anode of the tube 1 through an integrating network comprising a resistor 16 and a capacitor 19. If the resistance value of the resistor 16 is R ohms and the capacitance of the capacitor 19 C farads, the time constant RC of this network must be at least twice the duration of the period of the vertical deflection which may, for example, be 1/50 sec. Preferably the resistor 16 is smaller than the resistor 14.

With such values a parabolic voltage is produced across the capacitor 19 with the result that the charging current flowing through the resistor 14 decreases at the beginning and the end of the stroke of the sawtooth-shaped deflection current, which produces the desired correction.

Since the time constant of the integrating network is large compared with the duration of the period of the vertical deflection, which usually is equal to the duration of the period of the main voltage source, this network also acts so as to smooth any ripple components in the voltage source. For the sake of clearness it should be noted that, if the measure in accordance with the invention is not taken and consequently the resistor 14 is connected to a constant voltage source, a linear current flows through the deflector coil 5. For the sake of completeness the drawing also shows the discharging circuit of the capacitor 13. Discharging is effected through a tube 17 which is connected in known manner as a blocking oscillator by the provision of back-coupling between the screen grid circuit and the control grid circuit through a transformer 18.

What is claimed is:

1. A circuit arrangement for deflecting an electron beam, comprising a cathode-ray tube having a screen and a source for producing an electron beam directed toward said screen, a deflection coil positioned to deflect said electron beam across said screen, said screen having a radius of curvature which exceeds the distance between said screen and the center-of-deflection of said deflection coil thereby tending to cause linearity distortion of the scanning of said beam across said screen, an electron tube having an input electrode and having an anode coupled to said deflection coil, a source of periodical sawtooth voltage connected to said input electrode and comprising a capacitor and a charging resistor connected at an end thereof to said capacitor, a source of operating voltage connected to said anode, and an integrating network connected between said anode and the remaining end of said charging resistor and having a time constant equal to at least twice the duration of the period of said sawtooth voltage, thereby providing an electrical path for charging said capacitor from said voltage source and correcting for said distortion of the scanning of said beam across said screen.

2. A circuit arrangement for deflecting an electron beam, comprising a cathode-ray tube having a screen and a source for producing an electron beam directed toward said screen, a deflection coil positioned to deflect said electron beam across said screen, the edges of said screen along the direction of said deflection being farther away from the center-of-deflection of said deflection coil than is the center of said screen thereby tending to cause linearity distortion of the scanning of said beam across said screen, an electron tube having an input electrode and having an anode coupled to said deflection coil, a source of periodical sawtooth voltage connected to said input electrode and comprising a capacitor and a charging resistor connected at at end thereof to said capacitor, a source of operating voltage connected to said anode, and an integrating network connected betwen said anode and the remaining end of said charging resistor and having a time constant equal to at least twice the duration of the period of said sawtooth voltage, thereby providing an electrical path for charging said capacitor from said voltage source and correcting for said distortion of the scanning of said beam across said screen.

References Cited in the file of this patent
UNITED STATES PATENTS

| | | |
|---|---|---|
| 2,147,559 | Schlesinger | Feb. 14, 1939 |
| 2,621,309 | Faudell | Dec. 9, 1952 |
| 2,662,197 | Le Comte | Dec. 8, 1953 |
| 2,678,405 | Goodrich | May 11, 1954 |
| 2,682,012 | Lockhart | June 22, 1954 |